UNITED STATES PATENT OFFICE.

SPENCER B. NEWBERRY, OF SANDUSKY, OHIO.

WHITE NON-STAINING PORTLAND CEMENT AND PROCESS OF MAKING SAME.

No. 900,874.      Specification of Letters Patent.      Patented Oct. 13, 1908.

Application filed March 13, 1905. Serial No. 249,787.

*To all whom it may concern:*

Be it known that I, SPENCER B. NEWBERRY, a citizen of the United States, residing at Sandusky, in the county of Erie and State of Ohio, have invented a certain new and useful Improvement in White Non-Staining Portland Cement and Process of Making Same, of which the following is a full, clear, and exact description, reference being had to the accompanying drawings.

My invention relates to the production of a white and non-staining Portland cement, suitable for casts and ornamental artificial stone-work, and also, owing to its non-staining qualities, especially adapted for use as mortar for laying up marble, standstone, limestone brick or terra-cotta walls or facings of buildings, for which purpose ordinary Portland or natural hydraulic cements can not advantageously be used, owing to their tendency to stain the stone. The gray or brownish color and staining qualities of ordinary Portland or natural cement are caused by impurities, consisting chiefly of compounds of iron, contained in the materials from which these cements are made. My experiments have shown that it is possible to make a Portland cement of the highest hardening qualities from materials free from iron and consisting of lime, silica and alumina only.

In order to obtain in a commercial way a pure, white and non-staining Portland cement, it is necessary that the mixed materials shall contain not more than two tenths of one per cent., or at most three tenths of one per cent., of iron oxid. And in order to produce a slow setting cement of good hardened qualities, it is necessary, also, that the clay employed shall be silicious containing preferably from two and one half to three and one half times as much silica as alumina. It is not possible to use the ordinary white clays or kaolins, which contain much more alumina than the above proportion.

In making a white non-staining Portland cement, pure limestone and silicious clay, substantially as above defined, practically free from iron, is mixed in the proper proportions, and to the mixture is added cryolite (the double fluorid of aluminum and sodium). The cryolite is thoroughly mixed with the raw materials before burning, and from two to five per cent. of the cryolite is employed. I find that when this mixture is subjected to heat, the cryolite takes the place of the iron oxid, in ordinary cement mixtures, and acts similarly thereto in promoting the combination of the ingredients and the sintering of the clinker produced, and that such cryolite does not import into the cement any staining ingredients, and does not injure the hydraulic qualities of the resulting cement.

Claims:

1. The herein described process of producing a white non-staining Portland cement, which consists in mixing together white limestone, silicious clay as herein defined, and a small percentage of cryolite,—said mixture being substantially free from iron,— and burning the resulting mixture in the usual way, substantially as specified.

2. As a new article of manufacture, a white, non-staining Portland cement formed by burning a mixture of white limestone, silicious clay as herein defined, and a small percentage of cryolite,—said mixture being substantially free from iron, substantially as specified.

In testimony whereof, I hereunto affix my signature in the presence of two witnesses.

SPENCER B. NEWBERRY.

Witnesses.
  HENRY JEAVOUS,
  BERT MARTIN.